No. 728,065. PATENTED MAY 12, 1903.
E. G. WRIGHT.
PACKING FOR PIPE JOINTS.
APPLICATION FILED JUNE 16, 1902.
NO MODEL.
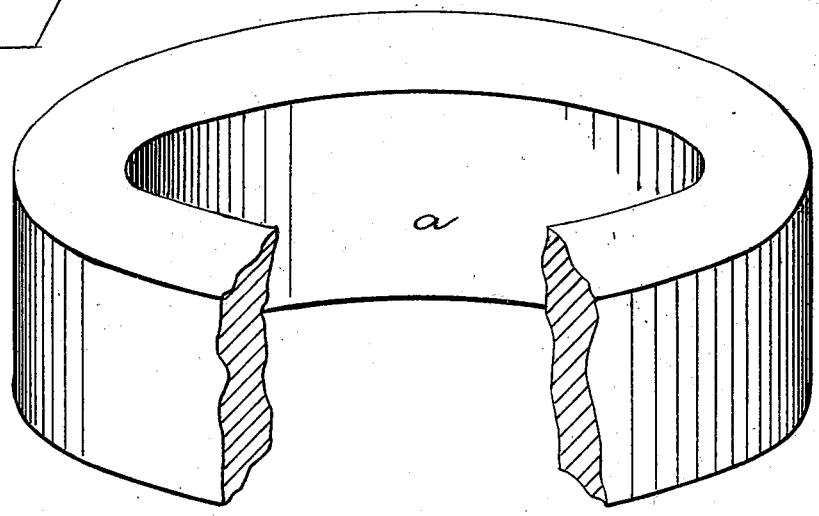
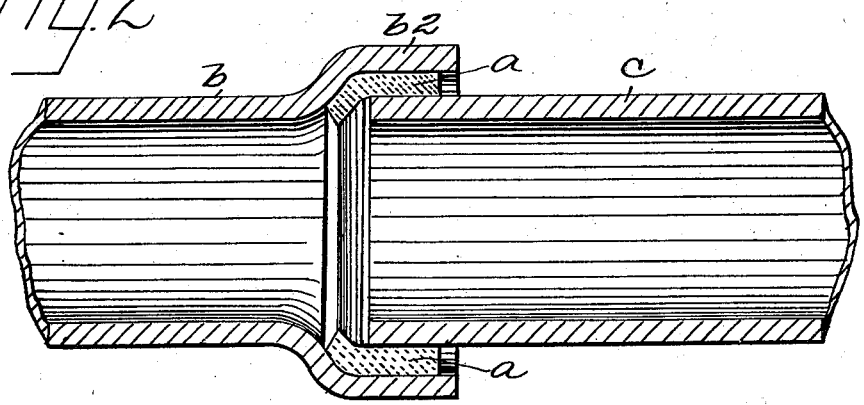
WITNESSES
INVENTOR
Elias George Wright
BY
Edgar Tate & Co
ATTORNEYS No. 728,065. Patented May 12, 1903.

UNITED STATES PATENT OFFICE.

ELIAS GEORGE WRIGHT, OF GUILDFORD, ENGLAND.

PACKING FOR PIPE-JOINTS.

SPECIFICATION forming part of Letters Patent No. 728,065, dated May 12, 1903.

Application filed June 16, 1902. Serial No. 111,823. (No model.)

*To all whom it may concern:*

Be it known that I, ELIAS GEORGE WRIGHT, a subject of the King of Great Britain, residing at Guildford, in the county of Surrey, England, have invented certain new and useful Improvements in Packing for Pipe-Joints, of which the following is a full and complete specification, such as will enable those skilled in the art to which it appertains to make and use the same.

The object of this invention is to provide an improved packing-ring for use in connection with pipe-joints of various kinds and classes—such as water-pipes, flush-pipes, electric conduits, and other pipe-joints of various kinds—and the invention is fully disclosed in the following specification, of which the accompanying drawings form a part, in which the separate parts of my improvement are designated by suitable reference characters in each of the views, and in which—

Figure 1 is a perspective view of my improved packing or pipe-coupling; and Fig. 2, a longitudinal section of a pipe-coupling, showing the use thereof.

In the practice of my invention I provide a packing-ring $a$, which is composed of natural or compressed granulated cork and which is also provided with a coating or covering consisting of a solution of bitumen.

In Fig. 2 I have shown two pipe members $b$ and $c$, and the pipe member $b$ is provided with an enlarged collar or socket-piece $b^2$, and in practice the packing-ring $a$ is inserted into said collar or socket member and the pipe $c$ is forced thereinto, and in this operation the packing-ring securely grips the pipe $c$ and holds the same in position, thus making a perfect center joint which can be used for any of the purposes hereinbefore specified or in connection with any form of a pipe-coupling or for connecting a faucet or spigot with a pipe.

In the operation of forcing the pipe member $c$ into the pipe $b$ or into the collar or socket thereof the connection is automatically sealed and neither air nor water nor any other liquid or gas can escape through the coupling, and by means of my improvement pipe-couplings of various forms and classes may be much more conveniently made than is possible with the means now employed for this purpose.

Having thus fully described my invention, what I claim as new, and desire to secure by Letters Patent, is—

A packing for pipe-couplings consisting of a ring or band composed of compressed granulated cork and coated with a solution of bitumen.

In testimony that I claim the foregoing as my invention I have signed my name, in presence of the subscribing witnesses, this 31st day of May, 1902.

ELIAS GEORGE WRIGHT.

Witnesses:
WILLIAM SPOONER,
EDWARD HART.